March 14, 1939.    G. F. DALY ET AL    2,150,208
TABULATING MACHINE
Filed April 3, 1931    5 Sheets-Sheet 1

INVENTOR
BY ATTORNEY

March 14, 1939.  G. F. DALY ET AL  2,150,208
TABULATING MACHINE
Filed April 3, 1931        5 Sheets-Sheet 2

INVENTOR
George F. Daly and
Gustave Tourkantz
BY their ATTORNEY

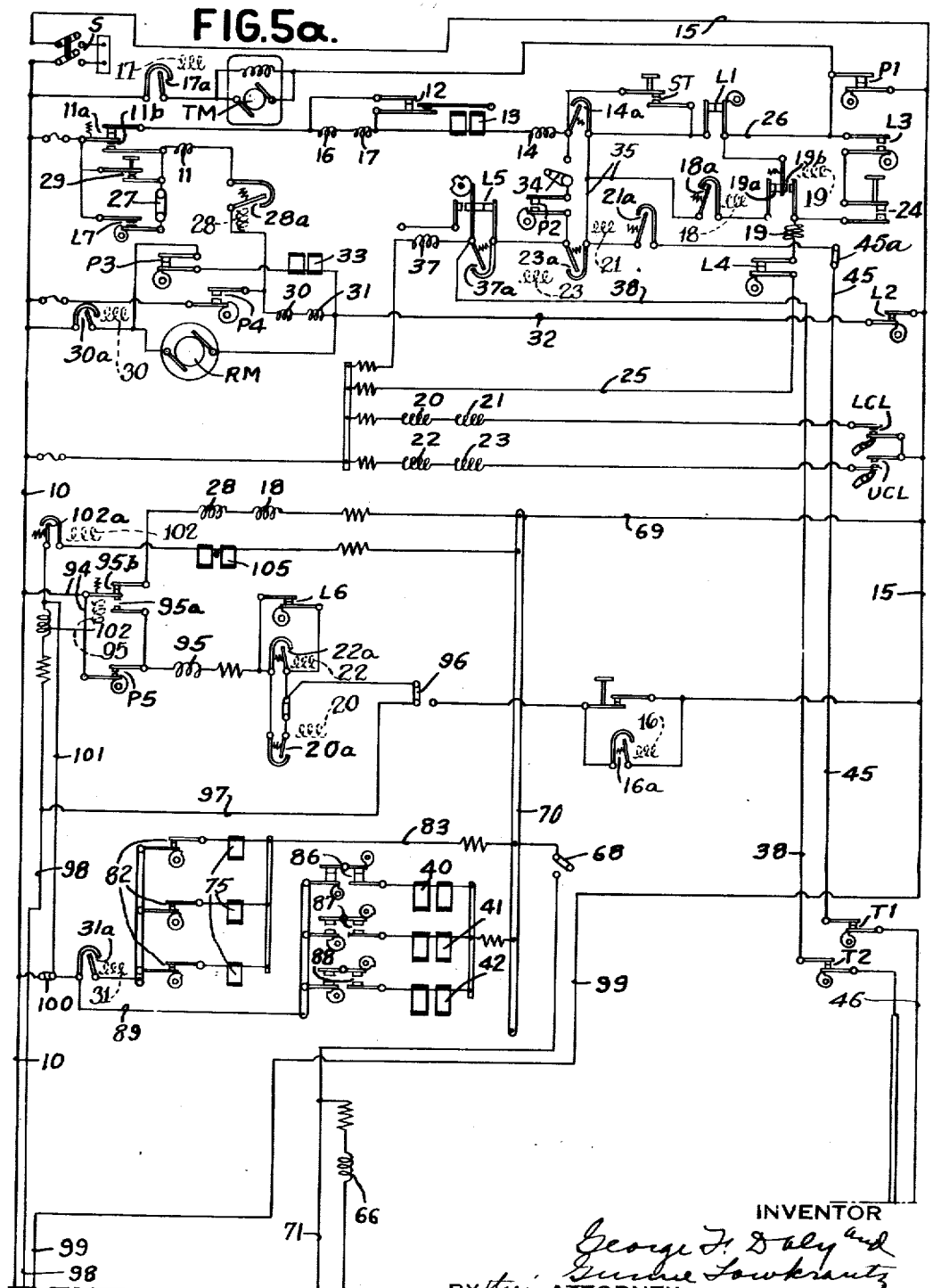

March 14, 1939.  G. F. DALY ET AL  2,150,208
TABULATING MACHINE
Filed April 3, 1931   5 Sheets-Sheet 4

INVENTOR
George F. Daly and
Gunne Sowkrautz
BY their ATTORNEY
A. C. Mabey

March 14, 1939.  G. F. DALY ET AL  2,150,208
TABULATING MACHINE
Filed April 3, 1931   5 Sheets-Sheet 5
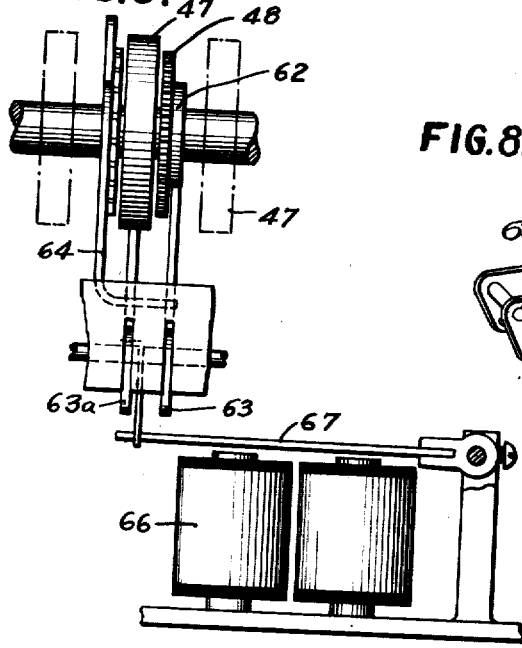
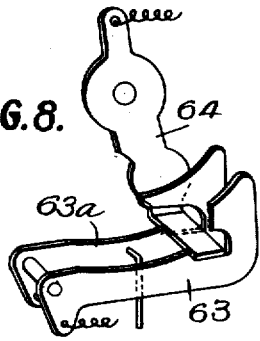
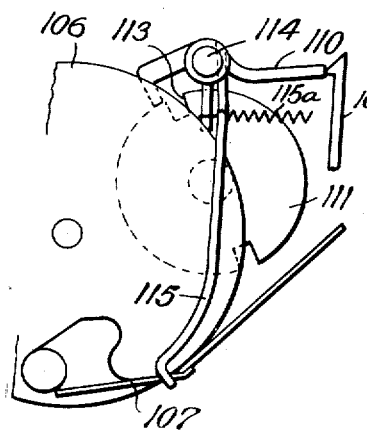
INVENTOR
George F. Daly
Gunnar Lowkrantz
BY their ATTORNEY Patented Mar. 14, 1939

2,150,208

UNITED STATES PATENT OFFICE 2,150,208

TABULATING MACHINE

George F. Daly, Johnson City, and Gunne Lowkrantz, Binghamton, N. Y., assignors, by mesne assignments, to International Business Machines Corporation, New York, N. Y., a corporation of New York Application April 3, 1931, Serial No. 527,594

9 Claims. (Cl. 235—61.7)

This invention relates to accounting machines and more particularly to accounting machines of the record controlled tabulator type.

The principal object of the invention is to provide a tabulating machine of improved selectivity of operation and of increased utility together with simplification and improvement of the mechanical structure with a view to imparting additional operating features as well as improvement in and increased efficiency and utility of the features previously found in such machines.

A further object of the invention is to verify the perforations of data entered on record cards which data are the result of computations performed with other data on the same record card.

A still further object is to extend the field of usefulness of tabulating machines to the end that the result of mathematical computations such as subtraction or addition, recorded upon a record card may be positively checked and incorrectly punched cards segregated from the correct cards.

In a great many commercial establishments such as public utility corporations, insurance companies and other similar businesses it is customary to enter upon record cards data corresponding to several different values of an article or commodity. These values are usually compared by an operator and the sum or difference thereof punched in a separate field of the record card. In the specific application to public utilities these values may be "present" and "previous" meter readings for a particular type of service such as gas, electricity or water.

The difference between any two such readings will indicate the consumption for the period represented by the readings. Operators performing the required subtraction may sometimes err in the computation and again, in perforating the result in the punching machine, may depress the wrong key and incorrect data are then tabulated upon the card. Previously the checking of the computed results has been done by a visual inspection of the cards but this method of checking has been found unsatisfactory as the checker is liable to make the same error that was originally made by the operator who punched the card. Also the visual checking is a tedious and time-consuming operation.

The present invention is directed to the adaptation of a tabulating machine to the checking or verifying of manual computations in which the operation of checking is exceedingly rapid.

The checking tabulator as it is preferably called is of a construction substantially as disclosed in the patent to G. F. Daly et al., #1,762,145 for a Tabulating machine having a card magazine from which cards are fed singly past a set of upper analyzing brushes and exactly one machine cycle later past a set of lower analyzing brushes. The machine is wired so that one of a pair of accumulators will receive, in the case where a subtracting problem is being verified, an entry of the subtrahend from the upper brushes. At the same time the minuend is entered into the other of the pair of accumulators. During the next cycle, as the same card is passing the lower brushes, the remainder is added into the same accumulator which has received the subtrahend.

A comparison is then made between the two accumulators and if the subtraction punching is correct the sum of the subtrahend and remainder will be equal to the minuend indicated by a similar reading in each accumulator. The card is thereupon permitted to pass into the stacker in the usual manner.

If the two accumulators do not agree during this comparison operation, it is an indication that one of the factors is incorrectly punched and the card is automatically rejected into a special box provided for the purpose.

In the case where a summation is being verified the machine is wired to enter one of the items into one of the accumulators during the first cycle and the second item is added thereto during the second cycle during which the sum is also entered into the second accumulator. A comparison of the readings of the two accumulators will again determine the correctness of the computation causing the ejection of a card having a false result.

The machine is so arranged that after each checking operation if both accumulators agree they need not be reset, but may receive entries from succeeding cards in accordance with the type of problem being verified so that after each comparing operation, if the computations have all been correct both accumulators will contain an amount representing the cumulative total of all the remainders or sums as the case may be. A reset cycle is initiated upon the non-comparison of the two accumulators following an entry therein, during which cycle the incorrectly punched card is ejected and the accumulators are zeroized. In this manner a multiplicity of unnecessary reset cycles is eliminated and the operation of the machine is much more rapid in consequence thereof.

According to the present invention it is proposed to sense the data on the cards during successive machine cycles without lengthening the interval between cards. This is accomplished by providing three pairs of accumulators, and an overlapping relationship between the reading-in and comparing operations. Preferably while the minuend and remainder of one card are being entered into one pair of accumulators, the subtrahend of the next succeeding card is concurrently entered into a second pair of accumulators, and the accumulators of the third pair are compared. The second pair is receiving the minuend and remainder of the second card while the third pair is receiving the subtrahend and the first pair is being compared and so on. Provision is also made so that upon failure of any pair of accumulators to agree the resetting operation will selectively restore only that pair of accumulators to zero, leaving the other pairs undisturbed with their incompleted computation.

The invention will be described for the purpose of illustration as applied to the verifying of problems involving subtraction incident to public utility meter readings although it is to be understood that the inherent features of the device and its particular co-operation with a tabulating machine make it adaptable to many and varied uses.

Figure 5B:
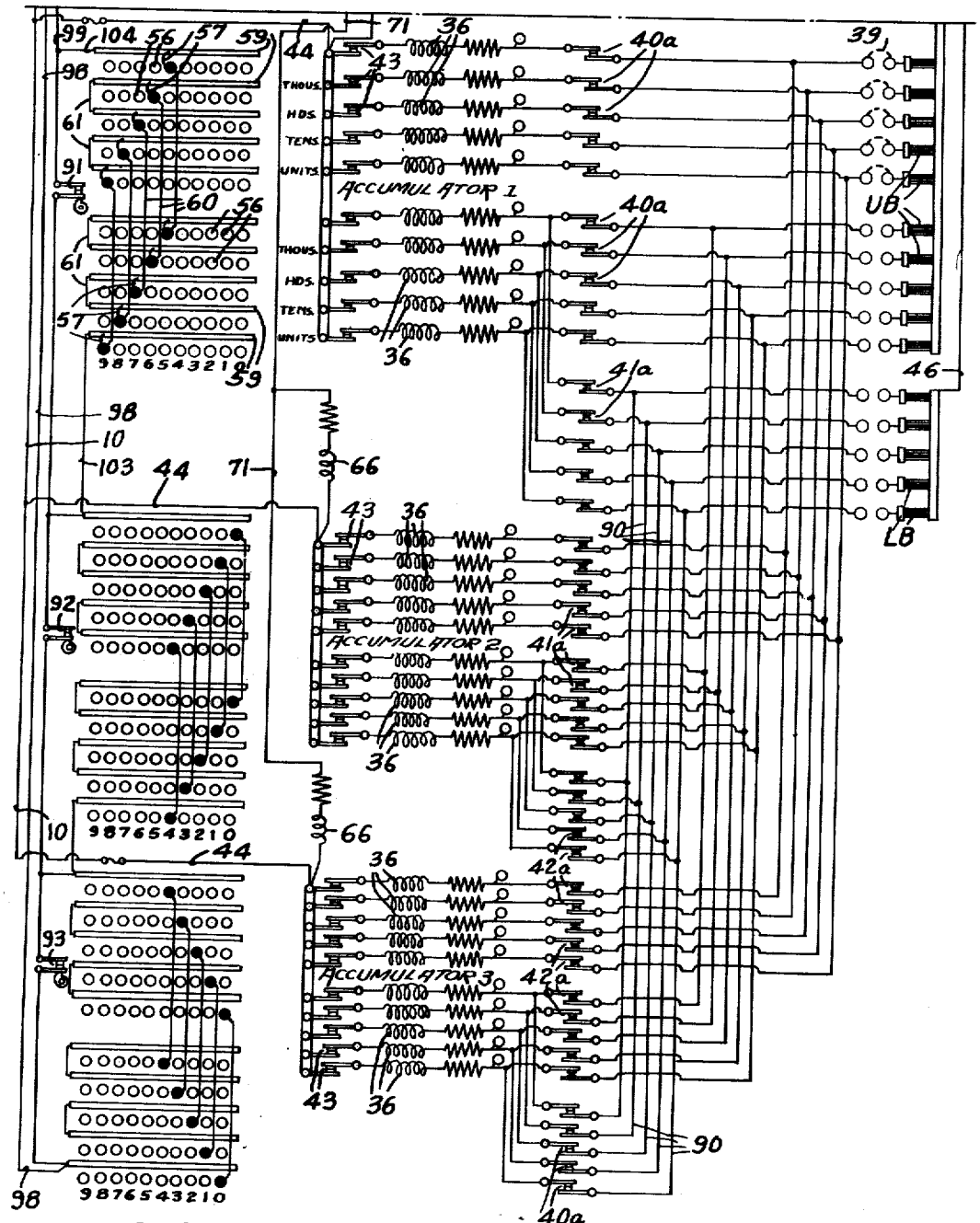

Figs. 5a and 5b taken together form a complete wiring diagram of the electric circuit of the machine.

Fig. 6 is a detail of the accumulator splitting device.

Fig. 7 is a fragment of a record card.

Fig. 8 is a detail in perspective of an accumulator splitting latch;

Fig. 9 is a position view of parts of the stacker mechanism;

Fig. 10 is a detail position view of the card ejecting mechanism.

For the purpose of illustration the invention has been shown as applied to a machine of the type disclosed in the patent referred to, and in order to simplify the disclosure and understanding of the comparing devices, the printing mechanism and associated instrumentalities shown in the above patent have been omitted from the present application.

Figure 2:
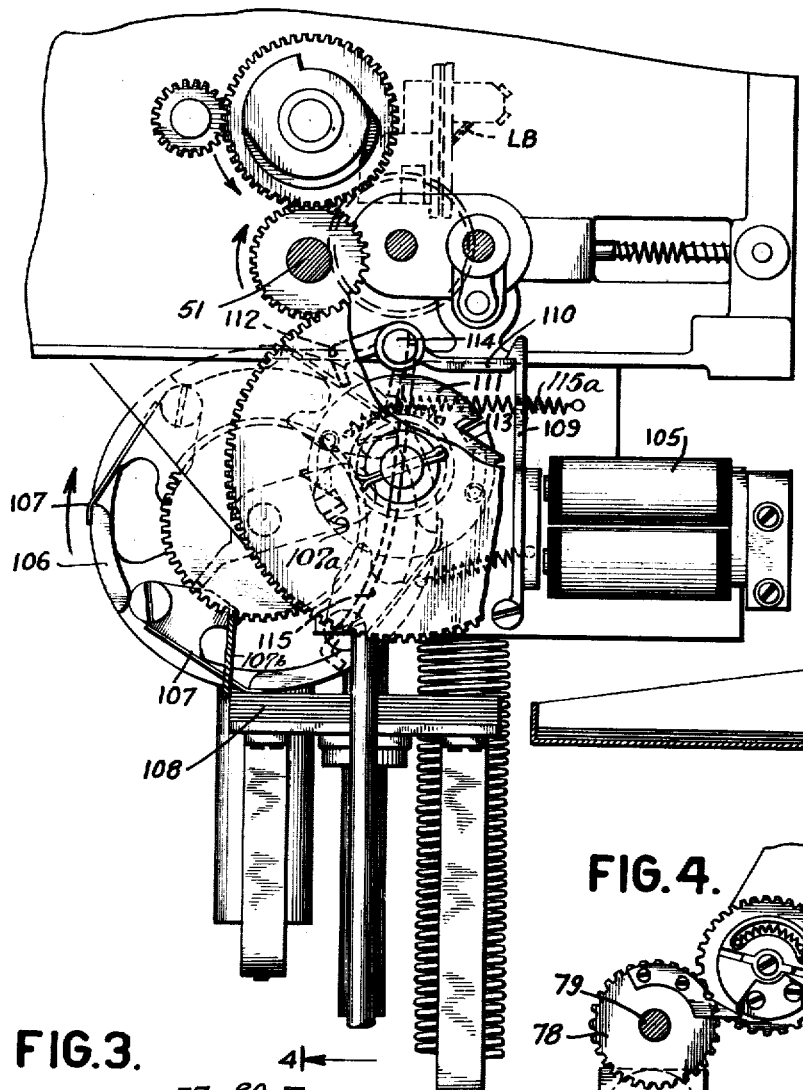
Fig. 2 is a detail of the stacker and card ejecting mechanism.

The machine is driven during card feeding operations by a motor TM (Fig. 5a) and during its operation cards are fed from the usual magazine one by one into engagement with the usual feed rollers which advance them past the upper analyzing brushes UB and exactly one machine cycle later past the lower analyzing brushes LB (Figs. 2 and 5b). In the diagram only a few brushes are illustrated but it will be understood the brushes may and usually do extend entirely across the card so as to cooperate with any desired columns therein. Upper and lower card levers are provided to close contacts UCL and LCL respectively during passage of cards under the card levers. When cards are not under the levers the contacts are open.

Motor starting circuit

In order to explain the wiring diagram, a detailed description will first be given of the various minor circuits after which a comprehensive description will be given of the operation of the entire machine in connection with a representative problem thus correlating the various minor circuits and explaining their inter-dependence in the achievement of the desired result. The first circuit concerns the starting of the tabulating motor to effect feeding of cards past the analyzing brushes and the continuance of these operations. Upon depression of the start key and closure of its contacts ST (considering cards to be in the supply magazine) the following circuit is established: From source of current S, line 10, points 11a of relay 11, clutch contacts 12, tabulating clutch magnet 13, relay coil 14, start key ST, contacts L1 (closed), contacts P1, line 15, back to source S.

It may be here explained that in tabulating machines of this type, it is common to utilize cam contact devices for controlling certain circuit operations. For clarity in the circuit diagram all cam contact devices which are operated in unison are given similar reference numerals. For instance, there is a group of contacts marked P1, P2, P3, operative during resetting and another group marked L1, L2, L3, operative during tabulating. In placing these cam contacts on the diagram, they have been located without regard to their mounting upon common shafts in order to obviate complications of the circuit connections. Similarly for clarity in the diagram it is necessary to place certain relay contacts at points remote from their controlling coils. In this case the contacts are labelled with the reference character of their controlling coil with a lower case letter appended thereto.

Energization of clutch magnet 13 permits contacts 12 to open and the circuit traced will thereupon include coils 16 and 17. Energization of coil 17 in this circuit causes closure of its points 17a in the motor circuit which is as follows: line 10, points 17a, motor TM, contacts P1 to line 15. Energization of clutch relay 14 closes a stick circuit around the start key contacts ST and contact L1 through motor control relay contacts 18a and stop relay contacts 19a (both normally closed).

With the motor TM and clutch magnet 13 energized the machine proceeds to feed cards and will continue to do so until the supply is exhausted or until the machine is stopped by other means. Closure of upper card lever contacts UCL established a circuit from line 15, contacts UCL, coils 22 and 23 to line 10. These coils thereupon close their respective points 22a and 23a and maintain them so, as long as cards are passing upper brushes UB. Closure of lower card lever contacts established a parallel circuit through coils 20 and 21 to close their points 20a and 21a respectively. Points 21a and 23a admit current to upper and lower brushes through circuits to be traced later. During the operation of the card feed all contact cams prefixed L operate and serve to maintain the machine in operation.

Stop circuits

The circuits traced above may be opened manually by operation of the stop key to close its contacts 24 or automatically under control of the checking or comparing devices which cause energization of the motor control relay 18 to open its points 18a.

Depression of the stop key, closing contacts 24, while the machine is running completes circuit from line 15, contact P1, contact L2 which closes for a short time as the "1" index point position is passing the brushes, contacts 24, stop relay coil 19, contact L4 which is closed for the major portion of the cycle, wire 25 to line 10. Energization of coil 19 causes opening of points 19a and closure of points 19b to establish a stick circuit from line 15, contact P1, wire 26, contact 19b, coil 19, contact L4, wire 25 to line 10. This circuit is held until the very end of the cycle when contact L4 opens. Meanwhile the running circuit for clutch magnet 13 has been shunted around contacts 18a and 19a by contact L1 which upon opening a short time before the end of the cycle deenergizes the clutch circuit and the parts come to rest in home position.

Reset circuits

The interruption of tabulating operations either prepares the machine for a manually initiated reset operation or automatically initiates a reset operation. The position of switch 27 determines whether the reset operation is to follow automatically or be manually initiated. Upon a non-comparison condition a relay coil 28 will become energized together with coil 18 with which it is in series. The circuit involved will be more particularly pointed out later.

Coil 18 will open its points 18a in the motor clutch circuit, interrupting the same, while coil 28 will close its points 28a. If switch 27 is open at this time the machine will come to rest and depression of reset key 29 will cause completion of the circuits through the reset clutch and motor as follows: from line 10, contact 29, coil 11, points 28a, coils 30 and 31, wire 32, cam contact L2 to line 15.

If switch 27 had been closed, the same circuit would have obtained through cam contact L7 at the end of the last tabulating cycle. Coil 11 closes its points 11b to form a holding circuit across contacts 29 and L7 the latter opening at the very end of the cycle. The coincident opening of points 11a of coil 11 prevents the energization of the tabulating clutch circuit during the ensuing reset operation. Energization of coil 30 will cause closure of its points 30a to complete the following circuit: from line 10, points 30a, contacts P3, reset clutch magnet 33, wire 32, contact L2 to line 15. A circuit through motor RM will parallel contacts P3 and magnet 33. These circuits will initiate a resetting operation during which the cams prefixed P operate. Toward the end of this reset cycle contact P4 closes, short-circuiting reset motor RM and later contact P3 opens to deenergize magnet 33. Contact P5 subsequently closes to cause deenergization of coil 28 and reopening of its contacts 28a in a manner to be explained.

Figure 3:
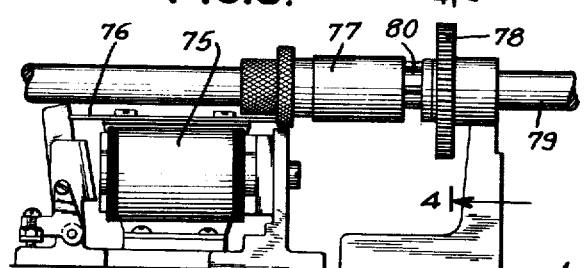
Fig. 3 is a detail of the accumulator reset selecting mechanism.
Figure 4:
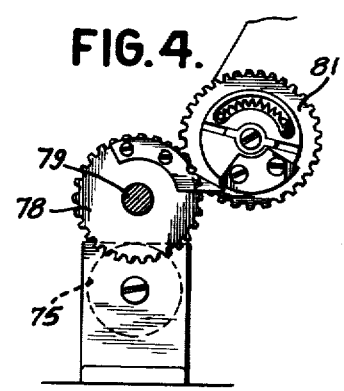
Fig. 4 is a detail section on line 4—4 of Fig. 3.

Provision is made for the selective resetting of the comparing accumulators during the reset cycle. Each of the comparing accumulators has associated therewith as shown in Figs. 3 and 4 a so-called zero button magnet 75 adapted upon energization to move a slider 76 toward the right to urge a member 77 toward a gear 78. Member 77 is slidable on reset shaft 79 but constrained to rotate therewith while gear 78 is loose thereon. A pin 80 is adapted to enter a suitable opening in gear 78 to provide a clutching connection whereby the gear will rotate with the reset shaft. In Fig. 4 gear 78 is shown as having connection with the usual gear 81 mounted on the end of the accumulator wheel shaft which when rotated in a clockwise direction restores the accumulator wheels to zero.

Figure 1:
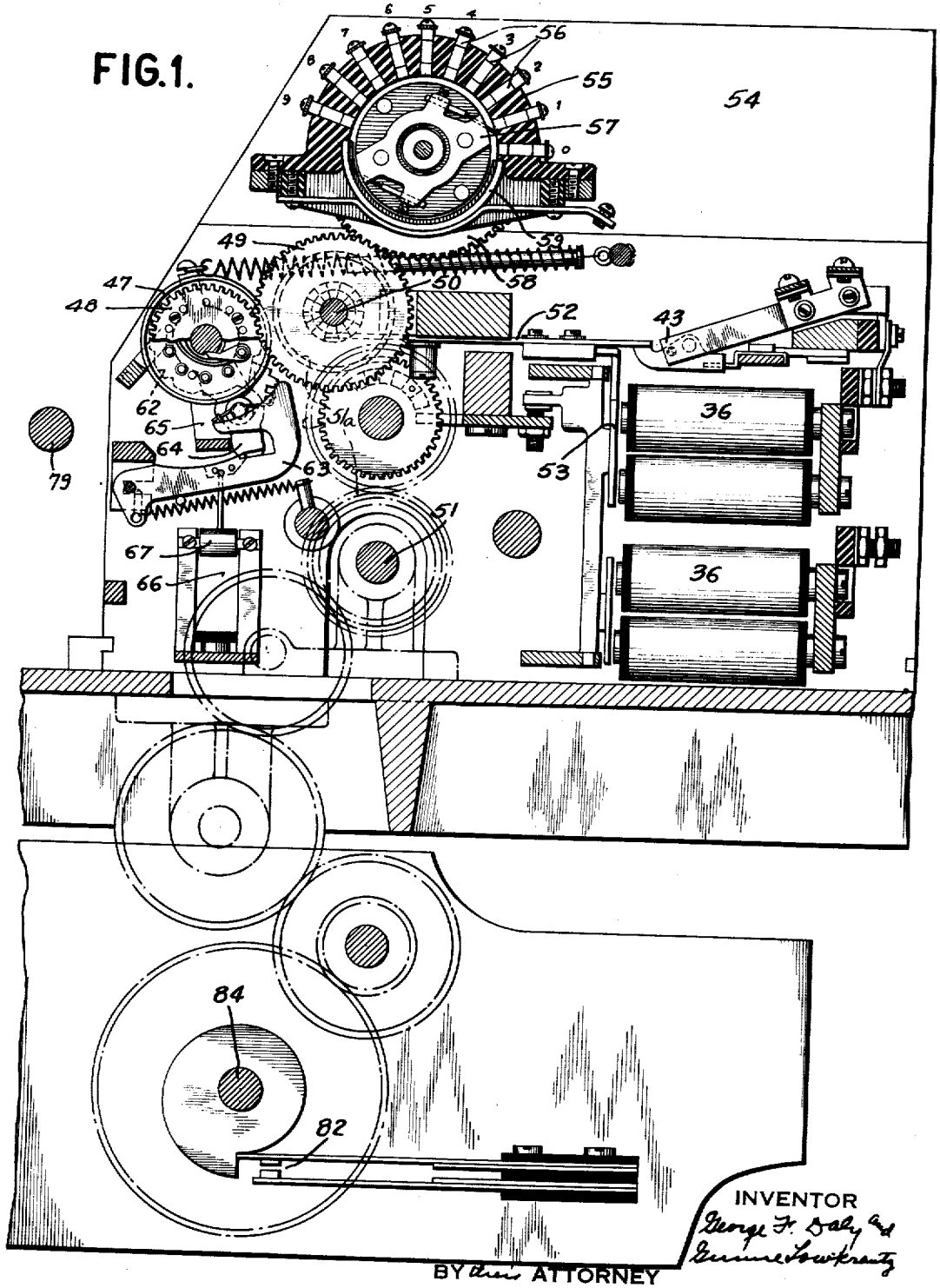
Fig. 1 is a central section taken through an accumulator showing the location of the comparing commutator.

In Fig. 5a, magnets 75 are shown diagrammatically and each magnet has associated therewith a cam contact 82 which contacts are adapted to close in succession during successive tabulating cycles. Upon interruption of tabulating only one of these contacts will be in closed position and the subsequent energization of the reset circuits, which as has been pointed out include coil 31 will cause the associated points 31a to close thereby establishing a circuit from line 10, switch 100, points 31a, the contact 82 which is closed at this time, its corresponding magnet 75, wire 83, bar 70, wire 69 to line 15. In Fig. 1 cam contact 82 is shown as being controlled by a cam mounted on a shaft 84 driven from accumulator drive shaft 51, the ratio being such that shaft 84 makes one third of a revolution for each revolution of the accumulator mechanism. Cam contacts 82 and the tabulating cycles are so coordinated that resetting will take place to restore the accumulator upon which a non-agreement is found.

Automatic restarting circuit

Tabulating may be automatically resumed at the end of this reset cycle of operations by closing the start switch 34. The cam contacts P2 close at the end of each reset operation and if switch 34 is closed completes the following circuit; from line 10, relay points 11a, contact 12, clutch magnet 13, coil 14, switch 34, contact P2, lower card lever relay contacts 23a (closed if cards are in the machine) wire 35, contacts 18a, 19a and P1 to line 15. The further control of the tabulating motor TM is as explained before.

Accumulators and entering circuit therefor

The machine is provided with three so-called checking accumulators which are diagrammatically represented in Fig. 5b, and labelled accumulator 1, accumulator 2 and accumulator 3 which perform corresponding functions in successive cycles for time saving purposes. When used for checking each accumulator is split into left and right hand sections or with reference to the diagram Fig. 5b, the upper and lower sections, one of which receives the minuend and the other receives the sum of the subtrahend and remainder. A comparison is then made between the two sections of the same accumulator to determine the accuracy of the computation.

During card reading operations circuits are completed through accumulator magnets 36 of the upper sections as follows: from line 15 (Fig. 5a), contacts P1, 19a, 18a, wire 35, points 23a, points 37a, wire 38, contact T2, perforation in the card, brush UB, plug connections 39 (Fig. 5b), contact 40a of multicontact relay 40, magnet 36, breaker contact 43, wire 44 to line 10. Points 37a are closed through energization of relay coil 37 which is effected by closure of contacts L5 completing a circuit from line 15, contacts P1, 19a, 18a, 23a, L5, coil 37 to line 10 at the beginning of the cycle. Points 37a also form a holding circuit for the coil 37, effective until one of the contacts 23a, 18a, 19a or P1, in series therewith, breaks. T2 is the usual impulse distributing contact adapted to close momentarily as each index point position of the digits 9 to 1 is sensed by the brushes. A similar circuit supplies current to the lower brushes from line 15, contact P1, wire 26, contacts 19a, 18a, wires 35, contact 21a, wire 45, impulse distributing contact T1, wire 46 (Fig. 5b) to the lower brushes LB.

The mechanism controlled by magnets 36 is shown in Fig. 1 and will now be described. As usual the timed energizations of magnets 36 control mechanism for entering the data corresponding to the card reading into the accumulator wheels. The detailed operation of these devices is fully explained in the Patent #1,307,740, issued to C. D. Lake on June 24, 1919.

In Fig. 1 the indicator wheels 47 carry accumulator gears 48 meshing with gears 49 loose on clutch shaft 50 which is geared to the accumulator drive shaft 51, through the usual gears 51a, and is driven thereby during the operation of the machine. The usual clutch connection is provided between shaft 50 and each denominational order of the accumulator and a tripping arm 52 normally latched by armature 53 is provided to permit gear 49 to be clutched to shaft 50 upon energization of magnet 36. Arm 52 is actuated upon release by a blade of contact 43 which thereby opens to interrupt the circuit to magnet 36.

The checking or comparing mechanism indicated generally at 54 in the upper part of Fig. 1 consists of a commutator 55 provided with segments 56 corresponding in number to the several indicating positions of indicator wheel 47. A brush structure 57 is mounted on a gear 58 driven by gear 49 so that the brush structure is angularly displaced according to the reading on the accumulator wheel. The structure carries two brushes, one of which engages the segments 56 and the other of which engages a common segmental conductor 59 whose surface corresponds to the configuration of the commutator. Segments 56 and conductors 59 are shown diagrammatically in Fig. 5b. Each accumulator as has already been pointed out is divided into two sections each section including five denominational orders and the corresponding segments 56 in corresponding orders are connected by wires 60. That is, the 0 segment in the units order of the upper section is connected to the 0 segment in the units order of the lower section; the "1", "2", etc., segments are similarly connected. The majority of these connections are omitted for the sake of clearness, only such being shown as are pertinent to a particular problem to be traced in detail later. The conductors 59 of the tens and hundreds order and of the thousands and tens of thousands orders of the lower section are connected by wires 61. The conductors 59 of the units and tens and of the hundreds and thousands orders of the upper section are similarly connected.

The mechanism for splitting the accumulators is shown in Figs. 1 and 6 and provides for the suppression of carrying from the highest order of one section into the lowest order of the other section. The usual carry mechanism comprises a carry cam 62 integral with wheel 47 and adapted to trip a member 63 to release a latch 64 which during the carrying portion of the cycle is restored by a bail 65 and during such period by means of the usual pawl and ratchet structure advances the next higher order to add one thereto. In the present instance, the highest order of the lower section is provided with an auxiliary member 63a normally in engagement with the latch 64 thus preventing its release when the member 63 is tripped by cam 62 (see also Fig. 8). When the accumulator is to be used intact for ordinary tabulating operations as a single unit this auxiliary member 63a is held out of cooperation with latch 64 thereby permitting the normal carrying operation to take place between the associated orders.

To this end a magnet 66 is provided which when energized draws downward upon its armature 67 and through a suitable connection rocks member 63a clockwise against the tension of its spring. To render the splitting device ineffective switch 68 (Fig. 5a) is closed and a circuit as follows is completed and remains energized as long as the switch remains closed: From line 15, wire 69, bus bar 70, switch 68, to wire 71 and thence in parallel to each magnet 66, wire 44, back to line 10.

The entering of amounts into the accumulators so that each accumulator will perform a complete computation in succession is controlled by the multicontact relays 40, 41 and 42, controlling their respective gangs of contacts 40a, 41a and 42a (see Figs. 5a and 5b). The energization of these magnets is controlled by contact cams 86, 87 and 88 which are mounted on shaft 84 (Fig. 1) which makes one revolution for every three revolutions of the accumulator mechanism. Contacts 86, 87 and 88 are arranged to close during the entering portions of the tabulating cycles in successive cycles. That is, during one cycle contact 86 is closed, during the next cycle contact 87 is closed and during the next cycle contact 88 is closed so that their respective relays 40, 41, 42 are energized in successive cycles. The circuits involved extend from line 10, switch 100, wire 89, contact 86, 87 or 88, magnet 40, 41 or 42, bus bar 70, wire 69 to line 15.

Referring now to Fig. 5b, during the first cycle with contacts 40a closed, entries will be effected from upper brushes UB to both sections of accumulator 1 and an entry will be concurrently made from the lower brushes LB into the lower section of accumulator 3 through wires 90 and further contacts 40a.

During the next cycle contacts 41a alone are closed and entries from the upper brushes will be made into both sections of accumulator 2 while an entry is at the same time made from the lower brush LB into the lower section of accumulator 1. During the third cycle, contacts 42a only being closed, entries from the upper brushes will affect both sections of accumulator 3 and the lower brushes will control the lower section of accumulator 2. It is thus apparent that the upper brushes control the accumulators in succession while the lower brushes control them similarly one cycle later and since the solution of any problem is not complete until an entry has been made from the lower brushes it follows that a comparison of the two sections of any accumulator takes place after such accumulator has received the factor obtained from the lower brushes.

*Checking circuits*

The checking of the computations will take place in each accumulator successively and will occur in the cycle following the last factor entry. Assuming an entry to have been completed in accumulator 1 wherein the minuend and the sum of the subtrahend and remainder equalled 56789, the various brushes 57 will occupy positions as shown diagrammatically in Fig. 5b wherein they bridge the several segments 56 and conductors 59. The permanent connections 60 are shown for only those positions involved in the problem.

A trio of cam contacts 91, 92 and 93 are controlled by suitable cams on the shaft 84 of Fig. 1 and their time of operation is such that they open momentarily in successive cycles after all the necessary entries have been made in their respective accumulators. When all contacts 91, 92 and 93 are closed they serve to maintain a control circuit which keeps the machine in operation.

This circuit is initially made during a reset cycle upon closure of contact P5 (Fig. 5a) as follows: from line 10, wires 94, contact P5, relay coil 95, contact L6, switch 96, wire 97, wire 98 (Fig. 5b), cam contacts 93, 92 and 91, wire 99 to line 15. Energization of coil 95 shifts contacts 95a to establish a stick circuit shunting contact P5. Incidentally the opening of contact 95b causes deenergization of relay coils 28 and 18. A further circuit follows from line 10 switch 100, wire 101, coil 102, wire 98, contacts 93, 92, 91, to line 15 as before. Energization of coil 102 maintains its points 102a in open position.

During each tabulating cycle one of the contacts 91, 92, 93 opens for a short period and has a tendency to interrupt the circuits in which it is included. However, if the two sections of the accumulator associated with the contact which opens, are in agreement a shunt is provided around such contact and the circuits are maintained. For example, if in accumulator 1, both sections are in agreement as shown diagrammatically in Fig. 5b, at the time contact 91 opens, the circuits will continue from line 98, closed contacts 93 and 92, to wire 103, units conductor 59 of the lower section of accumulator 1, brush 57, "9" segment, wire 60 to "9" segment in the units order of the upper section, brush 57 to the units conductor 59 of the upper section, wire 61 to the tens conductor 59 of the upper section, brush 57 to the "8" segment in the tens order of the upper section, wire 60 to the "8" segment in the tens order of the lower section, brush 57 to the tens conductor 59, wire 61 to the hundreds conductor, and so on back and forth between the upper and lower sections to the tens of thousands conductor 59 of the upper section, wire 104, wire 99 to line 15.

In a similar manner when each of the other contacts 92 and 93 opens if their associated accumulator sections are in agreement the circuit will be shunted around the open contact to maintain the circuit.

If at the time of opening of any of these contacts there is a disagreement in any accumulator the shunt circuit will fail to be completed and coils 95 and 102 will be deenergized. This will cause shifting of points 95a, 95b to the position shown in Fig. 5a to energize coils 28 and 18 which as has been pointed out herebefore will cause opening of points 18a to interrupt tabulating operations and closing of points 28a to initiate resetting operations. During the reset operation cam contact P5 will close to reestablish the circuits interrupted by the disagreement in an accumulator.

Card ejecting mechanism

Upon deenergization, coil 102 will permit closure of its points 102a so that a circuit may be traced as follows: from line 10, switch 100, wire 101, points 102a, magnet 105, bus bar 70, wire 69 to line 15. Referring now to Fig. 2 the usual rotary stacker 106 driven from shaft 51 is provided with clips 107 adapted to receive the leading edge of the card after it leaves the lower brushes LB and deposit it on the usual stack 108. Fig. 9 shows the position of the parts as a card approaches a clip 107. The clip is normally urged in a counterclockwise direction by a spring (not shown) and is adapted to be rocked to the position shown by a stationary cam roller 107a as the leading edge of the card arrives in the position shown. As stacker 106 continues to rotate, clip 107 will close on the card and carry it in a circular path until its leading edge strikes a stripper member 107b (Fig. 2) which impedes its further movement with clip 107 and the card consequently remains in position on top of stack 108. Magnet 105 when energized is adapted to rock its armature 109 to release a spring pressed member 110 permitting it to rock into engagement with a cam 111. At this time the card has just passed the lower brushes and is about to be engaged by one of the sets of clips 107 of the stacker (as shown in Fig. 9) and the card feed will come to rest, upon interruption of tabulating operations, with the parts in such position while resetting takes place.

Upon resumption of card feeding the card will continue toward the stack 108 (see Fig. 10) but before it reaches the same the nose 112 of member 110 will drop into the notch 113 of cam 111 rocking rod 114 in a counterclockwise direction. Upon rod 114 are secured fingers 115 which strike the leading edge of the card, stripping it from the clips 107 and projecting it outwardly under the influence of spring 115a toward the right into a box or other receptacle placed to receive it.

Recapitulation

In order that the complete operation of the machine may be better understood, a résumé of the different functions performed by the machine during checking or comparing operations will now be given.

Assuming the accumulators to be clear and cards placed in the feed magazine: Depression of the start key ST will initiate a tabulating cycle of operations wherein a card is fed past the upper brushes and data read therefrom into one of the accumulators, say accumulator 1. In a specific case as illustrated by the card in Fig. 7 these data read into the two sections of accumulator 1 would be the "Present reading" and "Previous reading". During this cycle cam contact L7 closes and causes interruption of the tabulating circuit and initiation of a reset cycle during which accumulator 2 is reset and contact P5 closes to set up the control circuit and also to break the circuit through coils 28 and 18 so that if the automatic restart switch 34 is closed card feeding will resume immediately upon completion of the reset cycle.

During the following cycle "Consumption" is read by the lower brushes from the first card and entered into the lower section of accumulator 1 where it is added to the amount already there. Concurrently, "Present reading" and "Previous reading" are entered through the upper brushes into accumulator 2 from the second card. During the third cycle contact 91 opens to test the control shunt circuit of accumulator 1. If the two sections are in agreement card feeding continues for another cycle: "Present reading" and "Previous reading" being entered into accumulator 3 and "Consumption" into accumulator 2. In the next succeeding cycle contact 92 opens to test accumulator 2 and if the amounts in both sections agree another tabulating cycle takes place completing the entry into accumulator 3 and making a further entry into accumulator 1. Accumulator 3 is then tested and if found to be in agreement the cycles of operation as outlined continue indefinitely until cards are exhausted or until a disagreement occurs in one of the accumulators. The control circuit thereupon becomes deenergized and coils 28 and 18 are energized to interrupt the card feeding operations and initiate a reset cycle during which only the accumulator found to have its two sections out of step is reset. The ejecting magnet 105 is also energized to cause segregation of the controlling card from the rest of the group. Card feeding again resumes as before.

It will be noted that successive entries into the accumulators are added to the amounts already standing therein so that after the first entries into each accumulator, the amounts do not represent the data on the card. The entries are progressively added into the accumulator and as long as the data already entered are in agreement, further agreeing entries will result in new totals which are also in agreement.

Since, the machine is only interested in whether the amounts in both sections of any accumulator are alike regardless of the value of such amounts, considerable time is saved in the operation of the machine: since if the accumulators were restored to zero after each operation many additional cycles would be required.

*Tabulating operation*

The machine is adapted to be used as an ordinary tabulating machine upon shifting certain switches so that cards may be passed therethrough and the amounts read therefrom and accumulated into the accumulators whose capacity is that of its upper and lower sections combined. To this end switches 27, 45a, and 100 are opened and switch 96 is shifted from the position shown on the wiring diagram and switch 68 is closed. Opening of switch 27 disables the automatic resetting mechanism. Switch 45a disconnects the lower brushes from active operation. Switch 68 completes the circuit to magnets 66 thus disabling the accumulator splitting mechanism. Switch 96 renders the control circuit ineffective and switch 100 disables the accumulator selecting multicontact relays 40, 41, 42 and also the ejecting control circuit.

We claim:

1. In a machine of the class described, a plurality of registers, means for entering amounts therein, contact devices settable by the registers in accordance with the amounts entered, electrical comparing devices for testing the setting of said contact devices, resetting mechanism for said registers, and means controlled by said comparing means, for causing the operation of said resetting mechanism.

2. In a machine of the class described, means for sensing perforations in record cards, a plurality of pairs of accumulators controlled by said sensing means in succession, devices settable by and in accordance with the settings of said accumulators, means controlled by said devices for comparing the settings of the pairs of accumulators in succession, resetting mechanism for said accumulators and means controlled by said comparing means for causing operation of said resetting mechanism.

3. In a checking machine, means for sensing data in record cards, a pair of accumulating devices controlled by said sensing means, commutators associated with said accumulators and settable in accordance with the reading contained therein, comparing circuits between said commutators, a control circuit for the machine, and means for including said comparing circuits in said control circuit to effect operation of the latter in accordance with the setting of said commutators.

4. In a machine of the class described, a plurality of entry receiving devices, each comprising circuit closing members, means for sensing a plurality of fields of a record card, means controlled thereby for causing the amount in each field sensed to be entered in a separate one of said entry receiving devices, a comparing circuit including said circuit closing members and adapted to be completed if the amounts are alike in each of said devices and a magnet in said circuit for controlling machine operation.

5. In a machine of the class described, a plurality of sets of analyzing means for analyzing the fields of a record card for amount designations therein, a pair of accumulators, entering means controlled by two of said sets of analyzing means to cause said entering means to enter a pair of amounts, one into each of said pair of accumulators, means controlled by a third set of analyzing means after said pair of amounts is entered for causing the entering means of one of said accumulators to enter an additional amount into its related accumulator whereby one accumulator will contain an amount from one field of the card and the other accumulator will contain the sum of the amounts in two other fields of the card, sets of settable devices, one set for each accumulator and positioned thereby to represent the amount therein, comparing means for comparing the settings of said sets of settable devices to determine whether the amounts represented thereby are like or unlike, means for rendering said comparing means effective after the entries have been made, a machine control device and means for rendering said machine control device operative under control of said comparing means in accordance with the like or unlike amounts in said accumulators.

6. In a machine of the class described, a plurality of sets of analyzing means for analyzing the fields of a record card for amount designations therein, a pair of accumulators, entering means therefor, means controlled by one of said sets of analyzing means for causing the entering means related to one of said accumulators to enter an amount from one of the fields of a card into said accumulator, means controlled by two other sets of analyzing means for causing the entering means related to the other accumulator to enter a pair of amounts from a pair of other fields of the card into said other accumulator, comparing means including devices settable by each of said accumulators for comparing the settings of said accumulators to determine whether the amount in one accumulator is equal to the total in the other, means for rendering said comparing means effective after the entries have been made, a machine control device and means for rendering said machine control device operative under control of said comparing means in accordance with the result of the comparison.

7. In a machine of the class described, means for sensing perforations in record cards, a plurality of pairs of entry receiving devices controlled by said sensing means in succession, devices settable by and in accordance with the settings of said accumulators, means controlled by said settable devices for comparing the settings of the pairs of entry receiving devices in succession, resetting mechanism and means controlled by said comparing means for causing operation of said resetting mechanism.

8. In a record controlled apparatus, means for separately analyzing a plurality of fields of a record for amount designations, further means for analyzing another field of said record for a further amount designation, an accumulator, means controlled by the first named analyzing means for causing the amounts in said plurality of fields to be entered into the accumulator, an entry receiving device, means controlled by said further analyzing means for causing the amount in said other field to be entered into said entry receiving device, a set of settable devices positioned by said accumulator to represent the result therein, a second set of settable devices positioned by said entry receiving device to represent the amount therein, means including both sets of settable devices for comparing the result in one with the amount in the other, and means controlled thereby for controlling the subsequent operation of the machine.

9. In a record controlled apparatus, means for separately analyzing a plurality of fields of a record for amount designations, further means for analyzing another field of said record for a further amount designation, an accumulator, means controlled by the first named analyzing means for causing the amounts in said plurality of fields to be entered into the accumulator, an entry receiving device, means controlled by said further analyzing means for causing the amount in said other field to be entered into said entry receiving device, a set of settable devices positioned by said accumulator to represent the result therein, a second set of settable devices positioned by said entry receiving device to represent the amount therein, means including both sets of settable devices for comparing the result in one with the amount in the other, a pair of record receptacles, means for normally feeding said record from said analyzing means to one of said receptacles, and means controlled by said comparing means when the result and amount compared are unequal in value for directing the record to the other receptacle.

GEORGE F. DALY.
GUNNE LOWKRANTZ.